Feb. 25, 1936.  A. URFER  2,031,803
RATE OF CLIMB INSTRUMENTS
Filed April 9, 1930
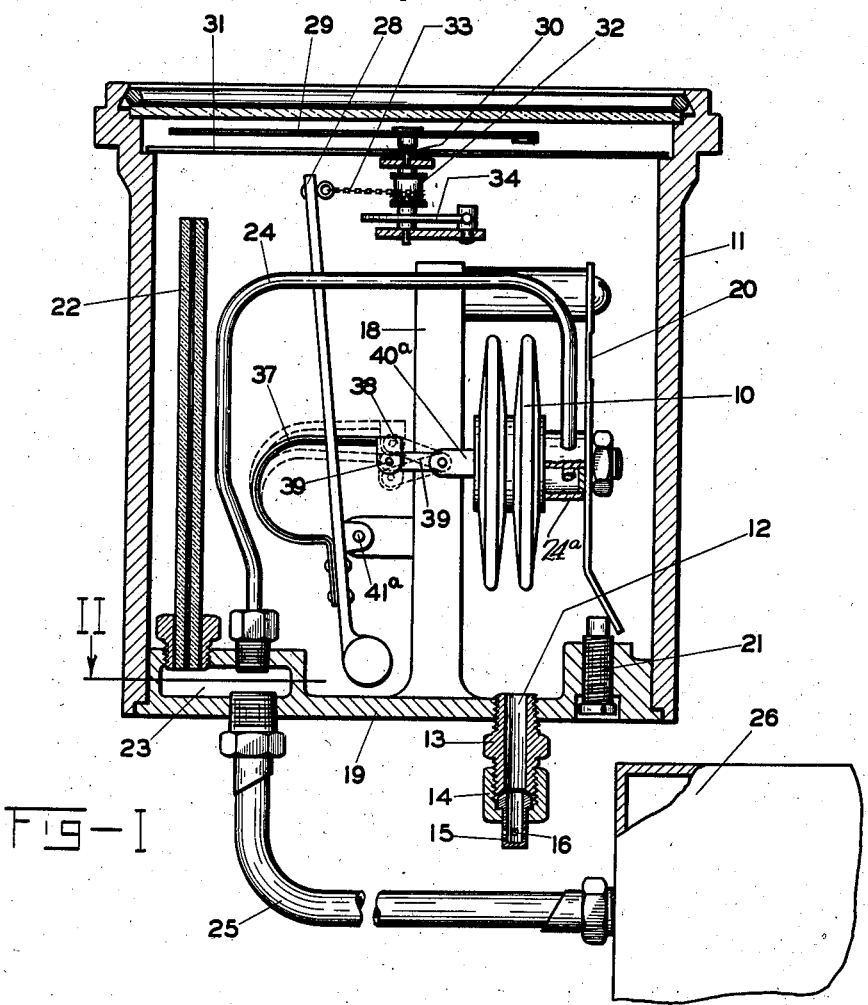
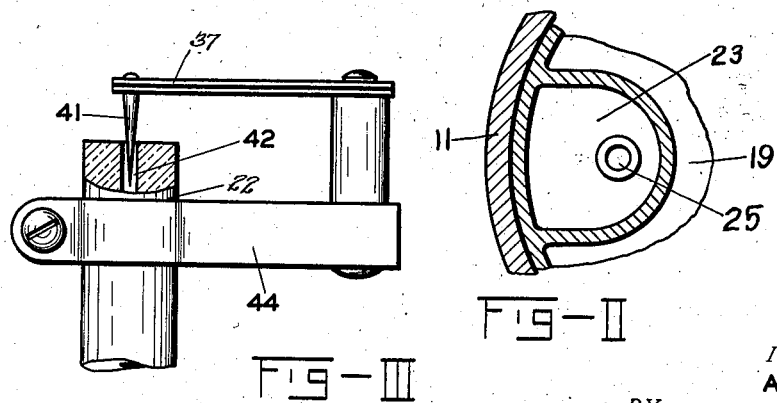
INVENTOR.
ADOLF URFER
BY
Cooper, Kerr + Dunham
ATTORNEYS.

Patented Feb. 25, 1936

2,031,803

UNITED STATES PATENT OFFICE 2,031,803

RATE OF CLIMB INSTRUMENTS

Adolf Urfer, Brooklyn, N. Y., assignor to Pioneer Instrument Company, Incorporated, Brooklyn, N. Y., a corporation of New York Application April 9, 1930, Serial No. 442,720

14 Claims. (Cl. 264—1)

REISSUED

This invention relates to rate of climb instruments. A simple form of rate of climb instrument may be described as having a diaphragm chamber which communicates with the atmosphere through a restricted orifice similar to a capillary tube. As the instrument is subjected to changing pressure conditions, the pressure within and without the diaphragm chamber tends to become equalized by the flow of air through the capillary tube. The rate of flow of air through the capillary tube under changing pressure conditions is a function of the rate of change of pressure taking place. The movement of an indicating hand which has connection with the yielding wall of such a diaphragm chamber may be used to give an indication of the rate of change of altitude taking place when such an instrument is carried by an aircraft in ascent or descent.

Among the objects of the present invention is to provide a rate of climb indicator of the class described having means for compensating the action or operation of the instrument by making corrections for errors introduced in the operation of the same because of changes in the viscosity of the air for different temperatures.

Other objects of the invention involve the utilization of thermostatic elements for automatically controlling the operation of a rate of climb instrument so as to afford greater accuracy of indication over wide ranges of temperature changes.

Other objects and advantages will be pointed out hereinafter in the description of the invention and illustrated in the drawing, in which, Fig. I is a section through a rate of climb instrument showing the working elements thereof and embodying the preferred construction of my invention.

Fig. II is a detail on line II—II of Fig. I.

Fig. III illustrates a modified form or device for accomplishing the purpose of the present invention.

It is a common practice to mount a diaphragm chamber 10 within another chamber formed by a casing 11. This second chamber or interior of casing 11 is subjected to atmospheric pressure at all times. The casing 11 preferably is made airtight but it is provided with a vent 12 by means of which it is placed in communication with the atmosphere in a region where normal atmospheric conditions exist. The particular vent connection illustrated has a member 13 to which may be connected, by a union 14, a member 15 having openings 16. This connection may be used in instances where the atmosphere about an instrument or in the vicinity of the vent is subjected to normal atmospheric pressure conditions at the altitude at which the aircraft is traveling. In the event that it is desired to vent the interior of the casing at a remote point, the member 15 may be replaced by a tube extending to a remote place. It is at once apparent that the chamber surrounding the diaphragm chamber and defined, in the present instance, by casing 11 may be of limitless extent so far as the usefulness of the present invention is concerned.

Referring to the construction illustrated herein, pillar 18 which extends from the wall 19 of the instrument supports the element 20 upon which is mounted the diaphragm chamber 10. One end of the diaphragm chamber 10 is maintained in a fixed position by a screw 21 which engages the free end of the element 20.

The interior of the diaphragm chamber 10 communicates with the atmosphere through a capillary tube 22. The capillary tube is supported from the wall of a chamber 23 which has free communication with the diaphragm chamber through conduit 24 and a hollow lug 24a. Also communicating with chamber 23, through conduit 25, is a heat insulated tank 26. This heat insulated tank is usually provided and its purpose is to increase the effective volume of air whose pressure is affected by the confined air active from within the diaphragm chamber 10. When the instrument is at a given pressure for any length of time, the same pressure prevails on the inside as well as the outside of the diaphragm chamber 10 and in tank 26 inasmuch as the diaphragm chamber is connected to the outside air by means of the capillary tube 22 and the casing vent 12. If now the aircraft carrying the instrument starts to climb, it immediately gets into air of lower pressure. This pressure finds its way to the outside of the diaphragm chamber 10 through the vent 12. The air inside the diaphragm chamber and in the tank 26 is, however, only at the pressure corresponding to the previous altitude inasmuch as the pressure of the volume of air in the diaphragm chamber and the tank cannot equalize immediately due to the small opening through the capillary tube through which the diaphragm chamber and the tank 26 are connected to the atmosphere. As long as the aircraft continues to climb, the pressure inside the diaphragm chamber remains higher than that outside thereof because it is not possible to catch up with the outside pressure. The pressure difference thus produced causes an expansion of the diaphragm and, hence, the pointer 29 is moved to indicate a climb. As previously stated, the heat insulated tank 21 is provided for the purpose of increasing the effective volume of enclosed air active from within the interior of the expansible diaphragm chamber 10. The rate of flow of air through the capillary tube during a change in elevation is a function of the rate of change of pressure which is taking place as the aircraft ascends, and hence a function of the rate of change of altitude which produces the rate of change of pressure.

In order to indicate the change of altitude occurring the motion of the yielding wall of the diaphragm chamber 10 is transmitted through a lever 28 to a needle 29, which is pivoted on a shaft 30. Needle 29 travels across the face of a dial plate 31 upon whose face proper graduations are imprinted. Shaft 30 carries a drum 32 which has fastened to it one end of the flexible element 33. The other end of the flexible element is fastened to the outer end of the lever 28. A hair spring 34 is provided for maintaining the flexible element taut so that the needle 29 is caused to respond to all movements of the lever 28. It has been the practice to connect the lever 28 with the yielding wall or movable end of the diaphragm chamber 10, and, with this understanding, the features of construction just described may be considered for the purpose of the present disclosure as being representative of a construction of a rate of climb instrument in general use.

The relation of the various factors which determine the rate of flow of air through the capillary tube may be expressed by the following formula:

$$P1 - P2 = \frac{v8nl}{\pi r^4}$$

where P1 is the pressure of the air entering the capillary tube and P2 is the pressure of the air leaving the capillary tube; $r$ is the radius of the orifice; $n$ is the coefficient of internal friction or viscosity of the air; $l$ is the length of the capillary tube; and $v$ is the volume which flows through the orifice in a given time.

The viscosity of the air is less for lower temperatures than it is for higher temperatures. It therefore is apparent that unless compensation is provided the drop in pressure through the orifice is less at low temperatures than at high temperatures for the same rate of change in altitude, and that because of the greater rate of flow of air at low temperatures than for high temperatures, an indication dependent upon the rate of flow is too great when low temperatures prevail if the instrument has been calibrated to indicate correctly at a higher temperature. Conversely, if an instrument has been calibrated to indicate correctly at a low temperature, the rate of flow of air through the capillary tube is lesser at a high temperature than for a lower temperature for the same rate of change in altitude or pressure. For the purpose of making a clear and concise disclosure of the invention, it will be desirable to refer only to a condition in which the rate of climb instrument has been calibrated to indicate properly at so-called high temperatures, which may be taken to be a high average temperature for temperate climates. The reference temperature is, of course, a matter of convenience and subject to selection.

An instrument of this character, when carried from the ground by an aircraft is usually exposed to much colder temperatures than ground or laboratory temperatures, especially when it is necessary to fly at high altitudes. At the high temperatures the viscosity of the air is increased and the instrument, unless corrected, will give indications of greater rates of change in altitude than those actually taking place. It is therefore desirable to provide means for automatically decreasing the reading of the rate of climb instrument when such conditions prevail, and, for accomplishing this, I have illustrated in Fig. I a thermostatic element 37 in the form of a bi-metallic member which is carried by lever 28. The free end 38 of the thermostatic element is pivoted to the link 39, which likewise is pivotally connected to the post 40a, rigidly mounted upon the yielding wall of the diaphragm chamber 10. This thermostatic element is so designed and disposed that its free end 38 moves away from the pivot 41a of lever 28 upon a decrease in temperature. Such a movement causes the indicating needle 29 to indicate less than the needle would indicate if no correction were provided for the lower viscosity of the air at the lower temperature prevailing. Upon an increase of the surrounding temperature, the free end 38 of the thermostatic element 37 moves toward the pivot 41a and increases the effect of the diaphragm on the indicating means. By such movement of the free end of the element in respect to the fulcrum of its supporting lever the reading of the indicating means is increased. It is therefore apparent that the result of undesired influences due to changes of viscosity of the air at different temperatures is corrected.

In Fig. III I have shown means by which the compensation may be made in a different manner. Instead of providing the thermostatic element 37 in the chain of mechanism, I may provide said element with a pin 41 and arrange said element in such a position as to enable said pin to enter or recede from the mouth of the orifice 42 of the capillary tube 22. The fastened end of the thermostatic element may be rigidly supported in any manner as, from the capillary tube, by means of a bracket 44. Since the viscosity of the air decreases as the temperature lowers and the rate of flow through the capillary tube becomes greater, the rate of flow may be corrected by reducing the cross sectional area of the orifice of the capillary tube, or any part thereof. Accordingly, the thermostatic element 37 in Fig. III should be so disposed as to cause pin 41 to move toward the capillary tube as the temperature reduces and to move away from the capillary tube as the temperature increases. At a higher temperature than that to which the instrument was subjected, when calibrated, the pin 41 will occupy such a position as to compensate for the greater rate of flow which would otherwise take place for the same rate of change in pressure if the efflux of air through the orifice were not impeded.

While I have referred in detail to various forms of devices by which errors due to changes in the viscosity of the air may be compensated for in rate of climb instruments, I do not wish to be restricted to any one embodiment of the invention disclosed, for it is apparent that changes in relations of parts and of combinations come within the purview of the present invention. To that end I contemplate such alterations and modifications as utilize thermostatic means for accomplishing the purposes primarily set forth and within the scope of the appended claims.

What I claim is:

1. A rate of climb indicator for aircraft comprising, in combination, a chamber, a second chamber, a yielding wall between said chambers and subject to differential pressures in said chambers, means placing one of said chambers in communication with the atmosphere, means placing the other of said chambers in restricted communication with the atmosphere, indicating means controlled by the yielding wall, and temperature responsive means intermediate said indicating means and yielding wall for correcting error in the instrument indication caused by changes in the viscosity of air from different temperatures.

2. A rate of climb indicator for aircraft comprising, in combination, a chamber, a second chamber, a yielding wall between said chambers and subject to differential pressures in said chambers, means placing one of said chambers in communication with the atmosphere, means placing the other of said chambers in restricted communication with the atmosphere, indicating means controlled by the yielding wall, and means intermediate said indicating means and yielding wall for transmitting the movement of said yielding wall to said indicating means, said intermediate means comprising a thermostatic element responsive to temperature changes.

3. A rate of climb indicator for aircraft comprising, in combination, a chamber, a second chamber, a yielding wall between said chambers and subject to differential pressures in said chambers, means placing one of said chambers in communication with the atmosphere, means placing the other of said chambers in restricted communication with the atmosphere, means for indicating the movement of said yielding wall in response to changes in the differential pressures in said chambers, and connecting means intermediate said indicating means and yielding wall, said connecting means comprising a thermostatic element having one end carried by a pivoted arm and its other end connected with said yielding wall and free to move toward and away from the pivot of its carrying arm.

4. A rate of climb indicator for aircraft comprising, in combination, a chamber, a second chamber, a yielding wall between said chambers and subject to differential pressures in said chambers, means placing one of said chambers in communication with the atmosphere, means placing the other of said chambers in restricted communication with the atmosphere, indicating means controlled by the yielding wall, and means connecting said indicating means and yielding wall for transmitting the movement of said yielding wall to said indicating means, said connecting means comprising an element automatically responsive to temperature changes for varying the indicating relation of the indicating means relative to the position of the yielding wall for different viscosity conditions of the air under the same pressure differential.

5. In a rate of climb indicator for aircraft, the combination of an expansible diaphragm device operated in accordance with changes in altitude, a capillary tube connected to the interior of said diaphragm device for providing a restricted flow of air from said device in accordance with the rate of change of altitude, indicating means operated by said device for indicating said rate of change of altitude, and temperature responsive means for affecting the rate of flow of air through said capillary tube from said diaphragm device in accordance with changes in the viscosity of the air due to changes in temperature.

6. In a rate of climb indicator, the combination comprising a diaphragm chamber closed from communication with the atmosphere except through the orifice of a capillary tube, means controlled by the wall of said diaphragm chamber for indicating its movement when said diaphragm chamber is subjected to changing atmospheric pressure, and thermostatic means for affecting the movement of said indicating means in respect to the movement of the wall of the diaphragm chamber and in accordance with changes in the viscosity of the air flowing through the capillary tube due to changes in the temperature.

7. In a rate of climb indicator, the combination of a casing provided with an opening to the atmosphere, an expansible diaphragm device in said casing, a capillary tube having one end thereof communicating with the interior of said diaphragm device and its other end open to the interior of the casing whereby the interior of said diaphragm device is connected in restricted communication with the atmosphere through said capillary tube and through the opening in the casing, means for indicating the movement of the walls of said diaphragm device when said device is subjected to changing atmospheric pressure, connecting means between said indicating means and said diaphragm device comprising a lever, a bimetallic element carried by said lever and extending therefrom, said element being disposed so that its free end moves to and from the fulcrum of the lever in response to temperature changes, and means connecting the free end of said bi-metallic element to said diaphragm device.

8. In apparatus of the class described, a casing having a chamber, means communicating said casing with the atmosphere, a movable indicator carried by said casing, an expansible diaphragm in said casing, operating means connecting said diaphragm and said indicator for operating the latter by the former, a reservoir containing a fluid and having communication with said chamber and mounted exteriorly of said casing, a tubular connection between the interior of said diaphragm and said chamber, a capillary tube connected to said chamber for providing restricted communication between the interior of said expansible diaphragm and the atmosphere through said chamber and said casing, and means responsive to temperature changes for producing a compensating effect on said indicator in accordance with changes in viscosity of the fluid so that said indicator will give true indications irrespective of said changes in viscosity due to changes in temperature.

9. In an instrument for indicating rate of change of altitude, a casing, means communicating said casing with the atmosphere, a movable indicator carried by said casing, an expansible diaphragm in said casing, operating means connecting said diaphragm and said indicator for operating the latter by the former, a capillary tube having a connection to said expansible diaphragm for providing restricted communication between the interior of said expansible diaphragm and the atmosphere through said casing, and means responsive to temperature changes for producing a compensating effect on said indicator in accordance with changes in viscosity of air so that said indicator will give true indications irrespective of said changes in viscosity due to changes in temperature.

10. In an instrument for indicating rate of change of altitude, a casing, means communicating said casing with the atmosphere, a movable indicator carried by said casing, an expansible diaphragm in said casing, operating means connecting said diaphragm and said indicator for operating the latter by the former, a reservoir containing air and having communication with the interior of said diaphragm and mounted exteriorly of said casing, a capillary tube having a connection to said diaphragm and said reservoir for providing restricted communication between the interior of said diaphragm and the atmosphere through said casing, and temperature responsive means for producing a compensating effect on said indicator in accordance with changes in viscosity of air so that said indicator will give true indications irrespective of said changes in viscosity due to changes in temperature.

11. In combination, an expansible diaphragm having a yielding wall subject to free atmospheric pressure on one side thereof, means for retarding the rate at which pressure on the other side of said yielding wall tends to become equal to a changing atmospheric pressure due to changes in altitude, indicating means actuated by said yielding wall in accordance with the rate of change of altitude, and temperature responsive means for producing a compensating effect on said indicating means in accordance with changes in viscosity of the atmosphere so that said indicating means will give true indications irrespective of said changes in viscosity due to changes in temperature.

12. In a rate of climb indicator for aircraft, the combination of an expansible diaphragm device operated in accordance with changes in altitude, a capillary tube connected to the interior of said diaphragm device for providing a restricted flow of air from said device in accordance with the rate of change of altitude, indicating means operated by said device for indicating said rate of change of altitude, and temperature responsive means for producing a compensating effect on said indicating means in accordance with changes in viscosity of air so that said indicating means will give true indications irrespective of said changes in viscosity due to changes in temperature.

13. In combination, an expansible diaphragm having a yielding wall subject to atmospheric pressure on one side thereof, means for retarding the rate at which pressure on the other side of said yielding wall tends to become equal to a changing atmospheric pressure due to changes in altitude, indicating means actuated by said yielding wall in accordance with the rate of change of altitude, and temperature responsive means for producing a compensating effect on said indicating means in accordance with changes in temperature so that said indicating means will give true indications irrespective of said changes in temperature.

14. In combination, an expansible diaphragm having a yielding wall subject to atmospheric pressure on one side thereof, means for retarding the rate at which pressure on the other side of said yielding wall tends to become equal to a changing atmospheric pressure due to changes in altitude, indicating means actuated by said yielding wall in accordance with the rate of change of altitude, and means connected to said diaphragm for producing a compensating effect on said indicating means so that the latter will give true indications irrespective of changes in temperature.

ADOLF URFER.